US009912800B2

(12) United States Patent
Adderly et al.

(10) Patent No.: US 9,912,800 B2
(45) Date of Patent: Mar. 6, 2018

(54) CONFIDENTIALITY-SMART VOICE DELIVERY OF TEXT-BASED INCOMING MESSAGES

(71) Applicant: INTERNATIONAL BUSINESS MACHINES CORPORATION, Armonk, NY (US)

(72) Inventors: Darryl M. Adderly, Morrisville, NC (US); Jonathan W. Jackson, Durham, NC (US); Ajit Jariwala, Cary, NC (US); Eric B. Libow, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 85 days.

(21) Appl. No.: 15/166,488

(22) Filed: May 27, 2016

(65) Prior Publication Data

US 2017/0346937 A1 Nov. 30, 2017

(51) Int. Cl.
*H04Q 7/10* (2006.01)
*H04M 1/725* (2006.01)
(Continued)

(52) U.S. Cl.
CPC ........... *H04M 1/7255* (2013.01); *H04W 4/14* (2013.01); *H04W 12/02* (2013.01)

(58) Field of Classification Search
CPC ........... H04M 1/7255; H04M 1/72552; H04W 4/008; H04W 4/14; H04W 12/02; H04W 4/12; H04L 51/38
See application file for complete search history.

(56) References Cited

U.S. PATENT DOCUMENTS 6,397,183 B1 5/2002 Baba et al.
7,117,020 B2 * 10/2006 Aarnio ................... H04L 51/38
455/418
(Continued)

FOREIGN PATENT DOCUMENTS

EP 2490213 A1 8/2012
EP 18999957 A4 2/2013

OTHER PUBLICATIONS

Goel, Utkarsh et al., "EMS: The Talking Mail Service," IEEE Third International Conference on Communication Software and Networks, May 2011, pp. 622-626.
(Continued)

*Primary Examiner* — Kathy Wang-Hurst
*Assistant Examiner* — Julio Perez
(74) *Attorney, Agent, or Firm* — Maeve M. Carpenter; Hye Jin Lucy Song; Heslin Rothenberg Farley & Mesiti PC (57) ABSTRACT

Methods, computer program products, and systems are presented. The methods include, for instance: a voice delivery application, running on a mobile device of a user, receives a text message from a user; by use of sensor inputs of the mobile device, the mobile device stores data regarding environment of the mobile device including external audio equipment, speed of the user, and bystanders within a hearing range of the environment; various data describing a sender of the text message and the bystanders are analyzed for respective relationships with the user and with each other to determine a confidentiality group dictating whether or not the text message may be heard by the bystander; the text message may be scanned for content screening, then according to configuration of the voice delivery application, the text message is securely delivered to the user by voice.

14 Claims, 9 Drawing Sheets

(51) Int. Cl.
*H04W 4/14* (2009.01)
*H04W 12/02* (2009.01)

(56) References Cited

U.S. PATENT DOCUMENTS

| | | | | |
|---|---|---|---|---|
| 7,649,877 | B2* | 1/2010 | Vieri | H04M 3/5322 |
| | | | | 370/352 |
| 8,538,386 | B2* | 9/2013 | May | H04M 1/7255 |
| | | | | 455/412.2 |
| 8,868,046 | B2 | 10/2014 | Fernicola | |
| 8,892,442 | B2 | 11/2014 | Schroeter | |
| 9,076,435 | B2 | 7/2015 | Jones et al. | |
| 2009/0012793 | A1 | 1/2009 | Dao et al. | |
| 2012/0215540 | A1 | 8/2012 | Goktekin | |
| 2012/0259633 | A1 | 10/2012 | Aihara et al. | |
| 2013/0275138 | A1 | 10/2013 | Gruber et al. | |
| 2014/0297285 | A1 | 10/2014 | Zhang et al. | |
| 2015/0072739 | A1 | 3/2015 | Schroeter | |
| 2015/0293745 | A1 | 10/2015 | Suzuki et al. | |

OTHER PUBLICATIONS

Anonymous, "Method for Triggering Events When Reading an eBook Aloud," IPCOM000235535D, Mar. 2014, p. 1 (+ cover).
DriveSafe.ly Free SMS Reader—Android Apps on Google Play, downloaded from internet Mar. 25, 2016, pp. 1-3.
IBM, "IBM Presence Insights," downloaded from internet Mar. 25, 2016, pp. 1-2.
Anonymous, System and Method for Including Route Guidance Based on Passenger Composition, Nov. 2015, pp. 1-2 (+ cover).
Mel, Peter and Tim Grance, "The NIST Definition of Cloud Computing," National Institute of Standards and Technology, Information Technology Laboratory, Special Publication 800-145, Sep. 2011, pp. 1-7.

* cited by examiner

CONFIDENTIALITY-SMART VOICE DELIVERY OF TEXT-BASED INCOMING MESSAGES

TECHNICAL FIELD

The present disclosure relates to mobile communication application, and more particularly to methods, computer program products, and systems for a confidentiality-concerned auditory delivery of text-based incoming messages by use of real time analysis of relationships amongst people associated with the auditory delivery.

BACKGROUND

As mobile communication technology has developed, and accordingly causes driving safety concerns due to distraction to drivers caused by incoming messages, many voice delivery tools of such incoming messages have also emerged. However, in case of confidential messages, it is not desirable to read out the confidential messages in presence of people other than an intended recipient.

SUMMARY

The shortcomings of the prior art are overcome, and additional advantages are provided, through the provision, in one aspect, of a method. The method for confidentially delivering a text-based message by voice includes, for example: receiving, by a voice delivery application running on a user mobile device, the text-based message to a user using the user mobile device sent from a sender using the sender device via mobile services network; storing device environment data including inputs from at least one sensor of the user mobile device; determining, based on the device environment data, that the user mobile device is enabled to read the text-based message out for the user, and that at least one bystander is present within a hearing distance from the user; recording that the sender and the bystander are in a same confidentiality group based on data including communication service subscription data of the user, contacts stored in the user mobile device, and social media data for each of the user, the sender, and the bystander, respectively; scanning content of the text-based message for any confidentiality restriction based on predefined keywords appearing in envelope data of the text based message; ascertaining that the user wants the text-based message to be read to the user, according to configuration of the voice delivery application or a response to read the text-based message from the user upon being prompted; and delivering the text-based message by voice such that the user hears the text-based message.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
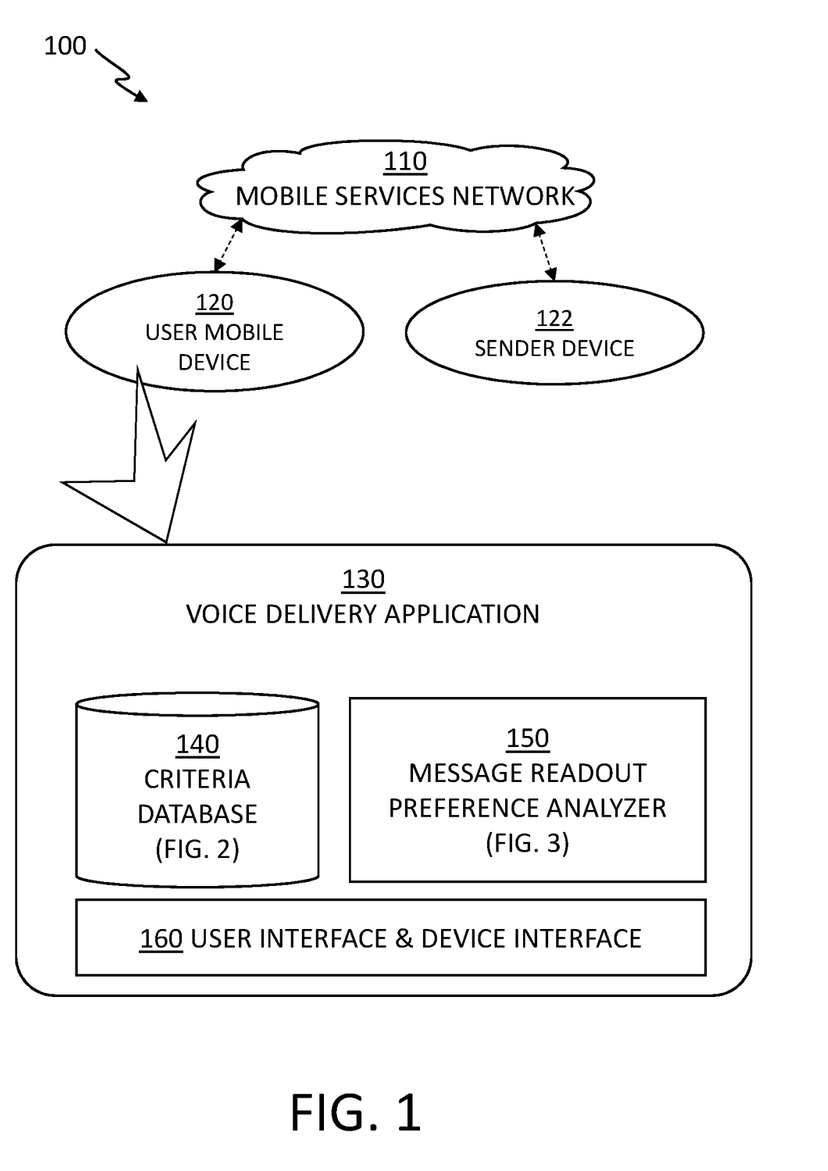
FIG. 1 depicts a voice delivery application in a mobile communication environment, in accordance with one or more embodiments set forth herein.

FIG. 1 depicts a voice delivery application 130 in a mobile communication environment 100, in accordance with one or more embodiments set forth herein.

The mobile communication environment 100 includes a user mobile device 120 and a sender device 122 connected by a mobile services network 110. The sender device 122 sends a text-based message to the user mobile device 120 via the mobile services network 110. In this specification, terms "text-based message", "text message" and "message" are used interchangeably; terms "mobile device" and "device" are used interchangeably. A sender associated with the sender device 122 and a user associated with the user mobile device 120 are subscribing to respective communication service, which are coupled to the mobile services network 110. Dashed arrows between the mobile services network 110 and both the sender device 122 and the user mobile device 120 represent that the devices 120, 122 are enabled to independently communicate with the respective communication service, as well as to communicate with each other via the mobile service network 110.

The user mobile device 120 includes the voice delivery application 130 that determines whether or not to read out the text-based message based on confidentiality concerns. In one embodiment of the present invention, the voice delivery application 130 is implemented as a mobile application that may be embedded in and/or downloaded to the user mobile device 120, which is a smart mobile device such as a smart cellular phone.

The voice delivery application 130 includes a criteria database 140, a message readout preference analyzer 150, and interfaces 160 for user interaction as well as for interactions with the smart mobile device. The voice delivery application 130 enables the user to promptly receive the text-based message while safely engaging in driving as well as preventing incidental breach of confidentiality of the text-based message caused by presence of bystanders who should not hear the same. In one embodiment of the present invention, the voice delivery application 150 may utilize an external commercial products to determine bystander composition and a confidentiality group associated with the bystanders by use of location data and/or other sensor data associated with the bystanders and applies real time analytics. In one embodiment of the present invention, the voice delivery application 130 and the message readout preference analyzer 150 are respectively implemented as one or more program 40 and program modules 42 of FIG. 5, which run on one or more processor 16 of FIG. 5, of a computer system 12 of FIG. 5, implementing the user mobile device 120.

The criteria database 140 includes data elements representing confidentiality criteria used by the message readout preference analyzer 150 to determine whether or not to read out the text-based message in the presence of bystanders such as passengers other than a user of the user mobile device 120 in a vehicle. The data elements of the criteria database 140 may include sender information in envelope data of the text-based message, subscription information of the respective communication service of the sender, the user, and the bystanders within hearing distance of the user mobile device 120, interrelationship data of the sender, the user, and the bystanders, social media profile and interrelationship data of the sender, the user, and the bystanders, etc. See FIG. 2 and corresponding description for details of the criteria database 140.

The message readout preference analyzer 150 determines whether or not to read out the text-based message in the presence of the bystanders, by use of default setting of the voice delivery application 130, as well as analysis of various confidentiality criteria information stored in the criteria database 140 as shown above and FIG. 2. See descriptions and figures FIGS. 3, 4A, 4B, and 4C, for details of the message readout preference analyzer 150.

In one embodiment of the present invention, the voice delivery application 130 utilizes a selection from technologies related to safe driving enabling hands free operation of mobile smart phones, text-to-speech/speech-to-text tools, caller ID tools, as well as cognitive message analysis by use of cloud services such as IBM® Watson cognitive services. (IBM is a registered trademark of International Business Machines, Corporation in the United States and other countries)

Figure 2:
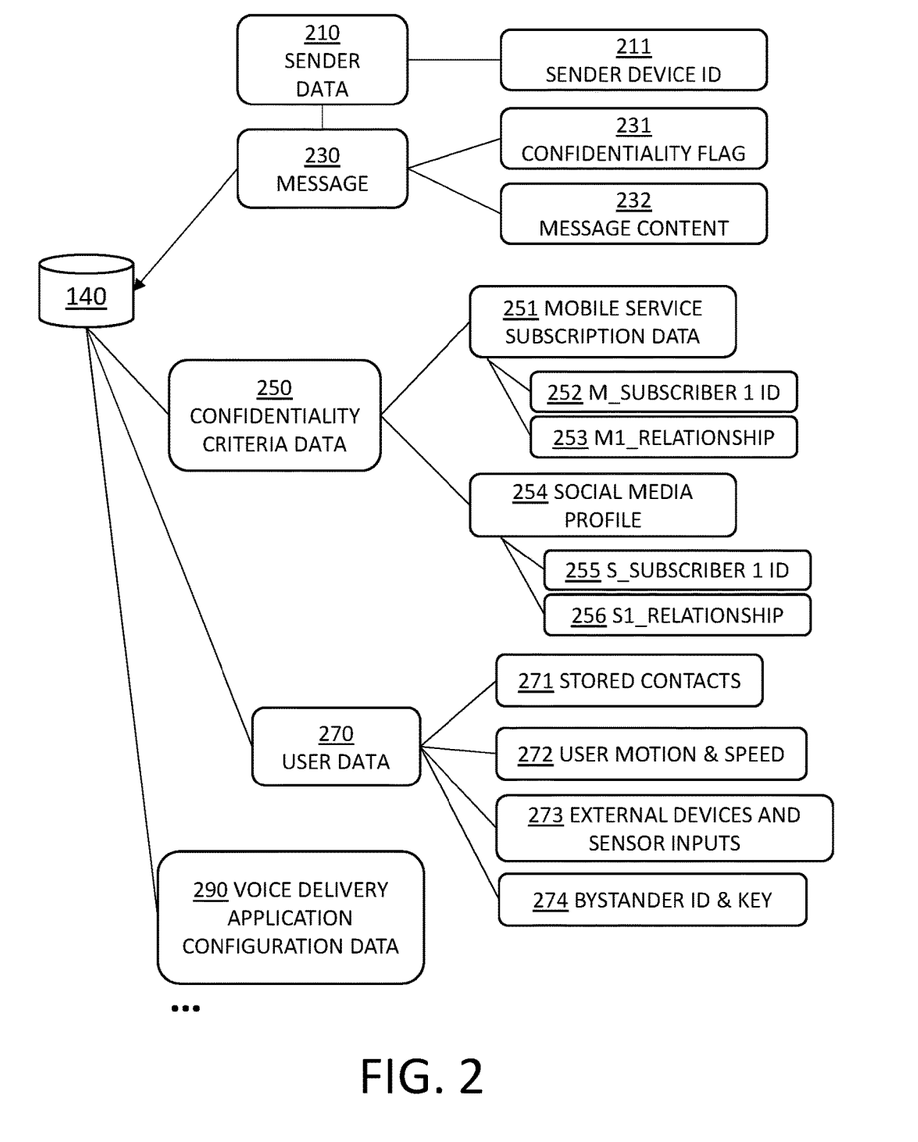
FIG. 2 depicts confidentiality-related data elements stored in the criteria database of FIG. 1, in accordance with one or more embodiments set forth herein.

FIG. 2 depicts confidentiality-related data elements stored in the criteria database 140 of FIG. 1, in accordance with one or more embodiments set forth herein.

The criteria database 140 includes sender data 210, message 230, confidentiality criteria data 250, user data 270, and voice delivery application configuration data 290.

The sender data 210 includes attributes including sender device ID or a phone number associated with the sender device, as an envelope information for the text-based message. The message 230 is the text-based message as represented by data elements including message content 232 having the body of the text-based message. The message 230 may further include a confidentiality flag 231 indicating a level of confidentiality requested by the sender for the text-based message. When the text-based message is delivered to the user mobile device, the sender data 210 and the message 230 are stored in the criteria database 140.

The confidentiality criteria data 250 includes numerous relationship data in determining whether or not the bystanders are at least in the same confidentiality group as the sender and the user. The confidentiality criteria data 250 includes mobile service subscription data 251 and a social media profile 254 for each bystander. The mobile service subscription data 251 includes a mobile subscriber identification/ phone number 252 and a relationship of the subscriber with the user 253. For example, when the user receives a text message without a confidentiality flag and if the sender, the user, and the bystanders are all subscribed to a group plan for a family and friends, then the text message is regarded not confidential to the bystanders. For another example, if the user and the sender subscribes to a same business plan and the text message is marked as "confidential" or having a business related keyword predefined for confidentiality, then the text message is confidential to the bystanders subscribing to the same family plan as the user. The social media profiles 254 includes a social media subscriber identification 255 and a social media profile 254 for each bystander. For example, if the sender sends a text message with no confidentiality flag to the user who is a friend with the sender, when the bystanders are also friends with the sender in the same social media, the text message may be non-confidential to the bystanders.

The user data 270 includes contacts 271 stored in the user mobile device and/or other account databases that are accessible from the user mobile device. The user data 270 further includes user motion and speed data 272, external devices and sensor inputs 273, and bystander identification and key 274 as detected from various sensors for reading proximity data of devices and global positioning system (GPS) data of the user mobile device.

The voice delivery application configuration data 290 includes default setting for various parameters of the voice delivery application such as threshold speed and confidentiality categories.

Figure 3:
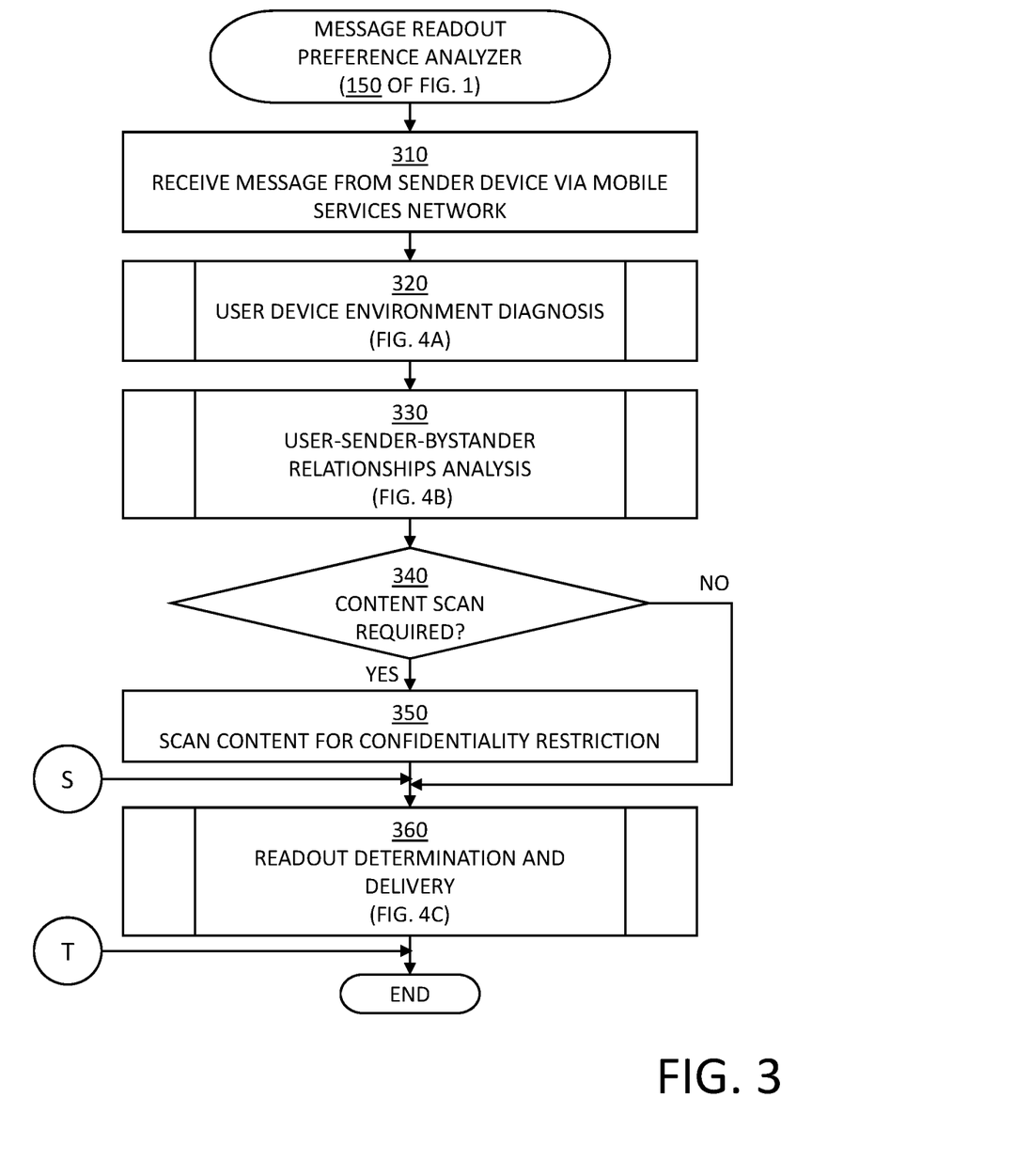
FIG. 3 depicts a top-level flowchart for the message readout preference analyzer of FIG. 1, in accordance with one or more embodiments set forth herein.

FIG. 3 depicts a top-level flowchart for the message readout preference analyzer 150 of FIG. 1, in accordance with one or more embodiments set forth herein.

In block 310, the message readout preference analyzer 150 of the user mobile device receives the text-based message from the sender device communicated via the mobile services network. The sender device may be, for example, a smart phone, a text message/email application running on a computer, etc. Then the message readout preference analyzer proceeds with block 320.

In block 320, the message readout preference analyzer 150 diagnoses the device environment of the user mobile device by use of sensor inputs and location data of the user mobile device. See FIG. 4A and corresponding description for details of the device environment diagnosis. Then the message readout preference analyzer proceeds with block 330.

In block 330, the message readout preference analyzer 150 analyzes interrelationships amongst the sender, the user, and the bystanders to determine which level of confidentiality is necessary for reading out the received message. See FIG. 4B and corresponding description for details of the relationship analysis. Then the message readout preference analyzer proceeds with block 340.

In block 340, the message readout preference analyzer 150 determines whether or not the content of the received message should be scanned for a confidentiality concern as in case of "confidentiality" flag value in the received message requiring a content scan, or the device environment and/or the relationships between the user and the bystanders are configured for the content scan, etc. If the message readout preference analyzer 150 determines that the received message needs to be scanned, then the message readout preference analyzer 150 proceeds with block 350. If the message readout preference analyzer 150 determines that the received message need not be scanned to keep it confidential, then the message readout preference analyzer 150 proceeds with block 360.

In block 360, the message readout preference analyzer 150 determines whether or not to deliver the message by reading it to the user based on the confidentiality information gathered so far, and either read the message to the user or not, according to the determination. See FIG. 4C and corresponding description for details of the readout determination and delivery. Then the message readout preference analyzer 150 terminates processing the message received in block 310 as the determination has been made and the delivery is executed accordingly. In one embodiment of the present invention, the message readout preference analyzer 150 may hand the control over to a voice reply application subsequent to block 360, according to the voice delivery application configuration data.

Figure 4A:
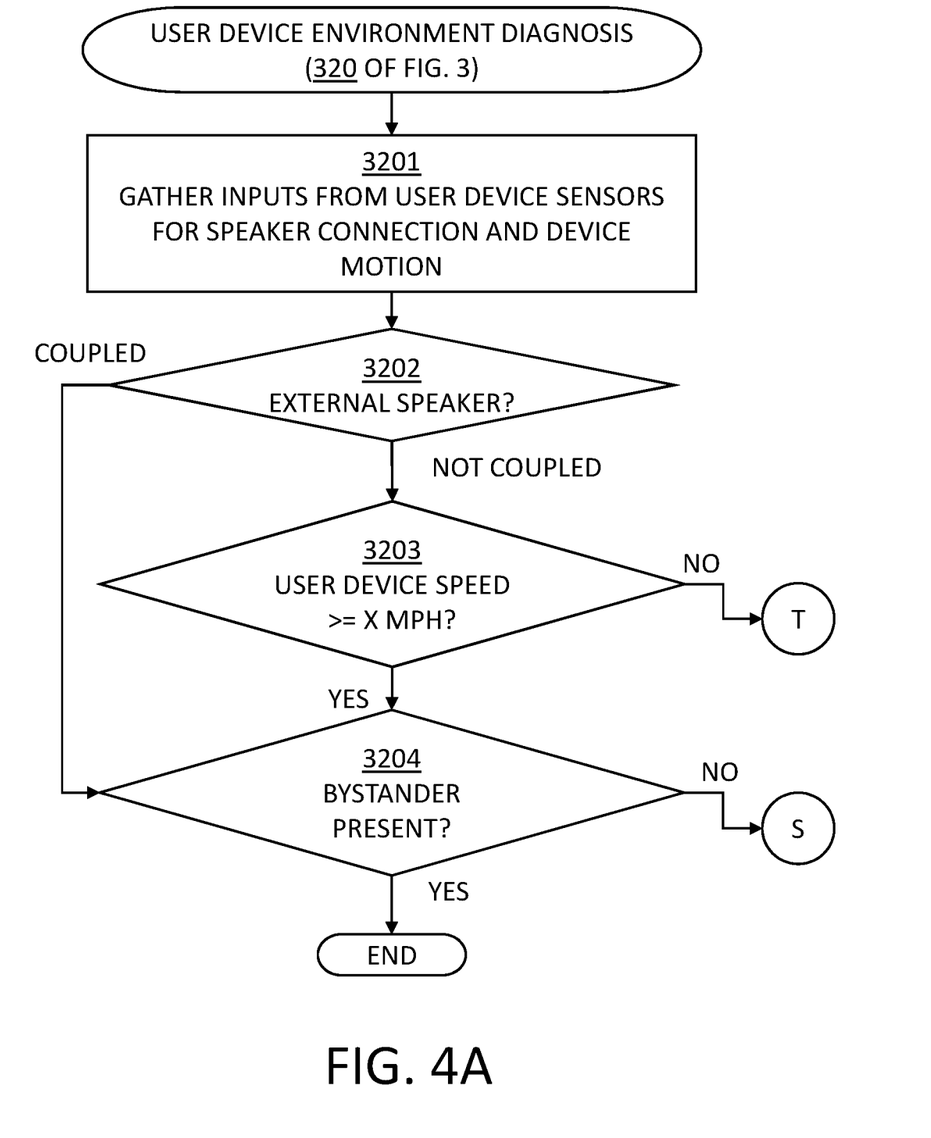
FIG. 4A depicts a flowchart of block 320 of the message readout preference analyzer of FIG. 3, diagnosing user device environment, in accordance with one or more embodiments set forth herein.

FIG. 4A depicts a flowchart of block 320 of the message readout preference analyzer of FIG. 3, diagnosing user device environment, in accordance with one or more embodiments set forth herein.

In block 3201, the message readout preference analyzer gathers inputs from sensors of the user device, particularly to detect external speakers coupled by a Bluetooth® interface, and to detect motion and speed by motion sensor inputs. (Bluetooth is a registered trademark of Bluetooth Special Interest Group (SIG), in the United States and other countries) Then the message readout preference analyzer proceeds with block 3202.

In block 3202, the message readout preference analyzer determines if the user mobile device is coupled to the external speakers. If the message readout preference analyzer determines that the user mobile device is not coupled to the external speakers, then message readout preference analyzer proceeds with block 3203. If the message readout preference analyzer determines that the user mobile device is coupled to the external speakers, then the message readout preference analyzer proceeds with block 3204. Wherein the external speakers are coupled, the message readout preference analyzer presumes that the user may be driving in a vehicle with a voice delivery capacity.

In block 3203, the message readout preference analyzer determines if the user is in motion by comparing the speed of the user mobile device to a predefined threshold speed. If the message readout preference analyzer determines that the user mobile device is moving at or faster than the predefined threshold speed, the message readout preference analyzer proceeds with block 3204. In one embodiment of the present invention, the predefined threshold speed is configured as ten (10) mph based on that the user moving at or faster than ten (10) mph is not safe to check the received message on the user mobile device without a voice delivery. If the message readout preference analyzer determines that the user mobile device is moving slower than the predefined threshold speed, the message readout preference analyzer terminates based on that the user moving slower than the predefined threshold speed may visually check the received message on the user mobile device in safety without the voice delivery.

In block 3204, the message readout preference analyzer determines if the user has any bystanders nearby. If the message readout preference analyzer determines that there is no bystander near the user mobile device, then the message readout preference analyzer proceeds with block 360 of FIG. 3, beginning at block 3601 of FIG. 4C, as the message may be read out to the user in privacy regardless of the content of the message. If the message readout preference analyzer determines that there is a bystander near the user mobile device, then the message readout preference analyzer proceeds with block 360 of FIG. 3, beginning at block 3301 of FIG. 4B, as the relationship with the bystander needs to be checked out for confidential voice delivery of the message.

In other embodiment of the present invention, the voice delivery application may be configured distinctively from blocks 3202, 3203, and 3204 to make the most appropriately presume the environment of the user mobile device, or may be configured according to inputs from the user.

Figure 4B:
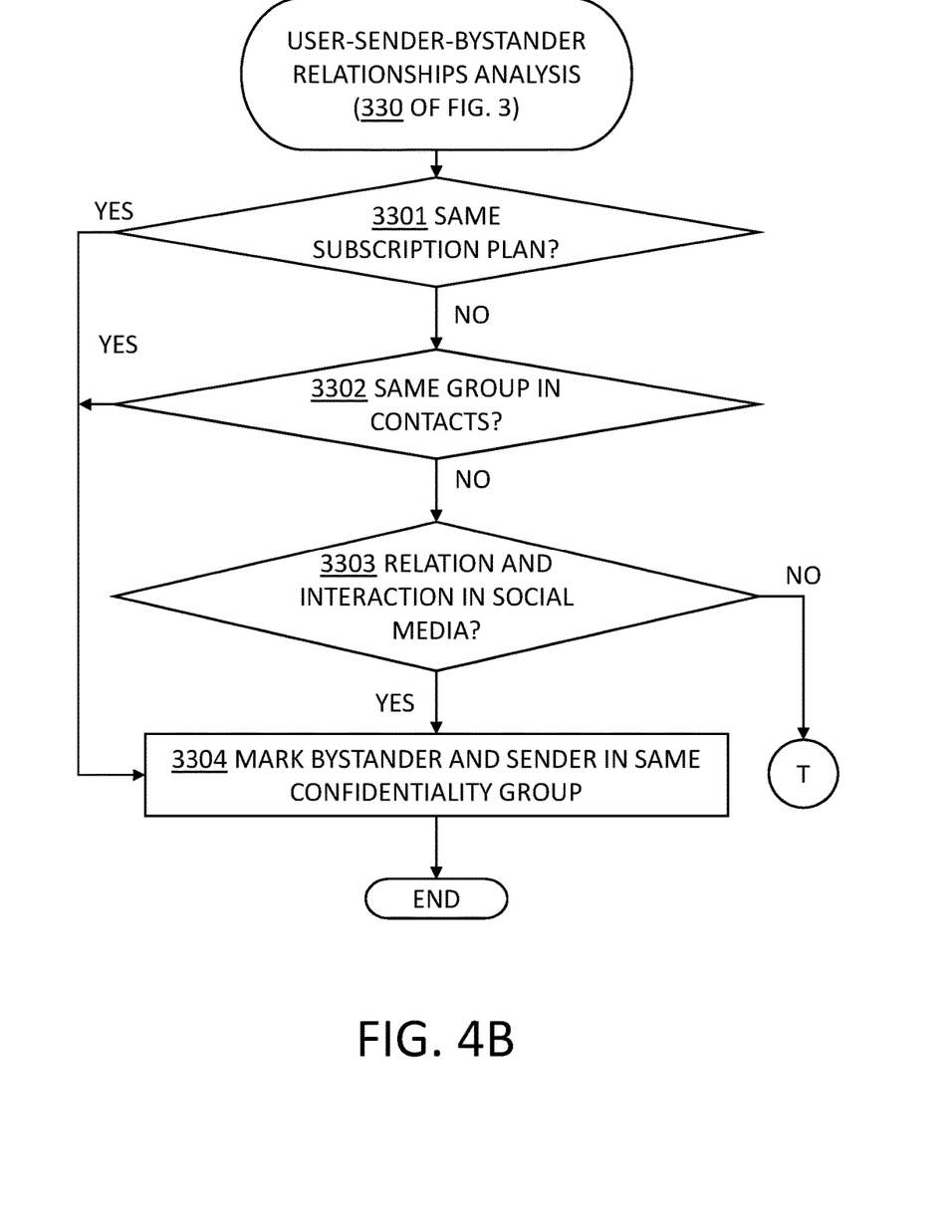
FIG. 4B depicts a flowchart of block 330 of the message readout preference analyzer of FIG. 3, analyzing interrelationships amongst the user, the sender, and the bystanders, in accordance with one or more embodiments set forth herein.

FIG. 4B depicts a flowchart of block 330 of the message readout preference analyzer of FIG. 3, analyzing interrelationships amongst the user, the sender, and the bystanders, in accordance with one or more embodiments set forth herein.

In block 3301, the message readout preference analyzer determines the user-sender-bystander interrelationship by examining the mobile service subscription data of the user for the sender identification and the bystander identification in the same group subscription plan as the user. The mobile service subscription data may be accessed from the mobile service provider in real time. If the message readout preference analyzer determines that the user-sender-bystander are in the same group plan as the user, then the message readout preference analyzer proceeds with block 3304, based on the inference that the people from the same subscription plan may confidentially share communication. Otherwise, the message readout preference analyzer proceeds with block 3302.

In block 3302, the message readout preference analyzer determines the user-sender-bystander interrelationship by examining contacts as stored in the user mobile device for entries representing the sender and the bystander and for group information of the contact entries. If the message readout preference analyzer determines that the user-sender-bystander are in the same group within the contacts as stored by the user, then the message readout preference analyzer proceeds with block 3304. Otherwise, the message readout preference analyzer proceeds with block 3303.

In block 3303, the message readout preference analyzer determines the user-sender-bystander interrelationship and interactions by examining social media profiles of the user, the sender, and the bystander for their relationships such as Friend or Follower status and their previous interactions such as Like or Retweet of Facebook, Twitter, Snapchat, WhatsApp, etc. If the message readout preference analyzer determines that the user-sender-bystander are related via social media and have enough interactions compared to a minimum set for a confidentiality group, then the message readout preference analyzer proceeds with block 3304. If the message readout preference analyzer determines that the user-sender-bystander relationship is not related and/or their interactions are less than minimum, then the message readout preference analyzer terminates processing the received text-based message for readout analysis, based on the inference that the user-sender-bystander do not have any relationship and cannot confidentially share communication.

In block 3304, the message readout preference analyzer marks the bystander for the same confidentiality group as the sender indicating that a message to and from any one of the user, the sender, and the bystander may be confidentially shared within the confidentiality group in the presence of any one in the confidentiality group. Then the message readout preference analyzer completes relationship analysis and proceeds with proceeds with block 340 of FIG. 3.

Figure 4C:
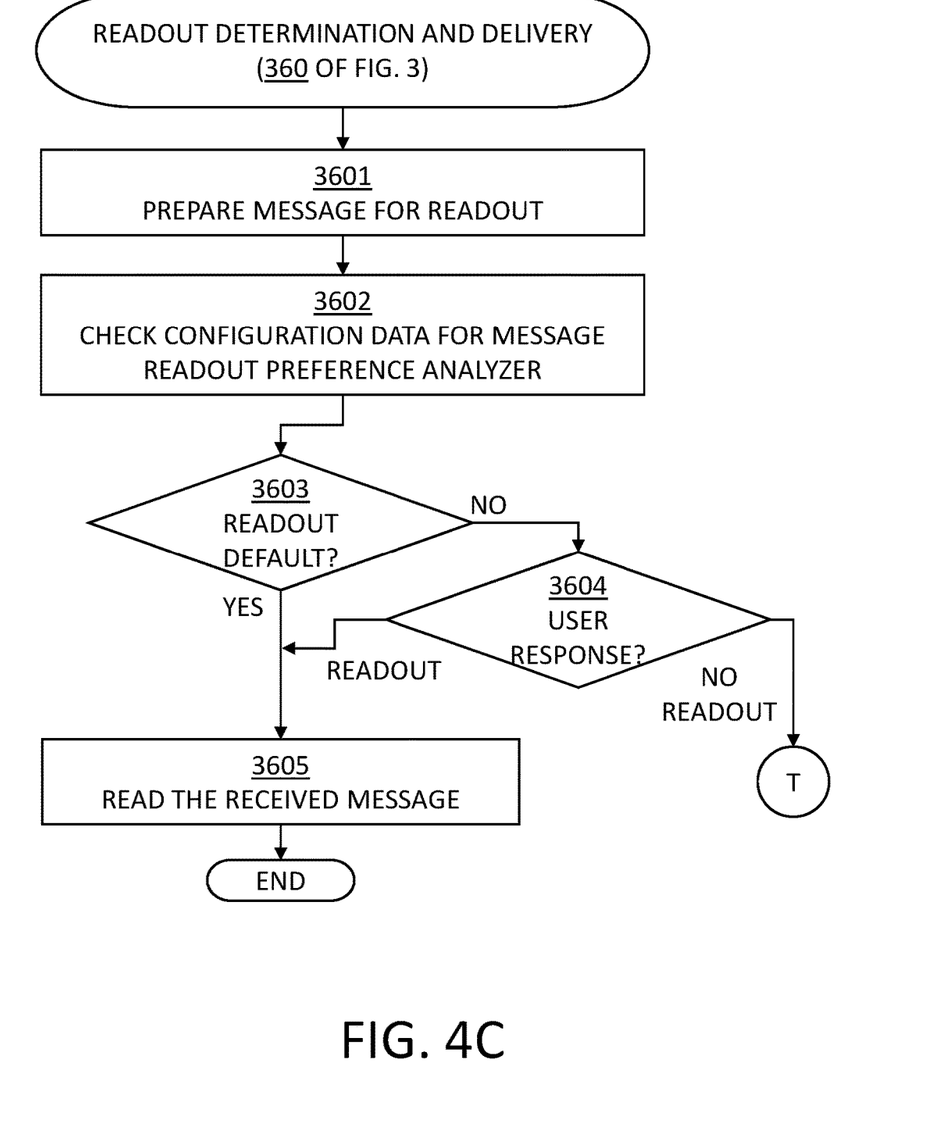
FIG. 4C depicts a flowchart of block 360 of the message readout preference analyzer of FIG. 3, making determination on as well as performing the voice delivery, in accordance with one or more embodiments set forth herein.

FIG. 4C depicts a flowchart of block 360 of the message readout preference analyzer of FIG. 3, making determination on as well as performing the voice delivery, in accordance with one or more embodiments set forth herein.

In block 3601, the message readout preference analyzer prepares to read out the message, as the relationship of audiences including the user and the bystander has been determined as confidential enough to share the received message, as well as the content is regarded to be safe to read out either after the content scan in block 350 or no content scan was deemed required. Such preparation may include, but not limited to, getting access to the external speakers coupled to the user mobile device as discovered in block 3202 of FIG. 4A, checking configuration for text-to-voice applications and/or functionalities available to the voice delivery application, etc. Then the message readout preference analyzer proceeds with block 3602.

In block 3602, the message readout preference analyzer checks configuration data of the message readout preference analyzer for readout preference setting by the user. Then the message readout preference analyzer proceeds with block 3603.

In block 3603, the message readout preference analyzer determines if reading the message out for a voice delivery is a default setting of the user. If the message readout preference analyzer determines that reading the message out is not the default setting of the user, then the message readout preference analyzer proceeds with block 3604. If the message readout preference analyzer determines that reading the message out is the default setting of the user, then the message readout preference analyzer proceeds with block 3605.

In block 3604, the message readout preference analyzer prompts the user for a response to whether or not to read the message out. If the user responds not to read the message out, then the message readout preference analyzer terminates processing of the received message. If the user responds to read the message, then the message readout preference analyzer proceeds with block 3605.

In block 3605, the message readout preference analyzer reads the received message to the user as either the user set the readout of text message as a default or the user responded to read the message out. In other embodiment of the present invention, the message readout preference analyzer may invoke a speech-to-text application subsequent to the read out such that the user may respond to the sender hands-free. Then the message readout preference analyzer completes processing the received message.

Certain embodiments of the present invention may offer various technical computing advantages, including increasing the security in mobile communication environments and the computing efficiency of mobile devices in determining a level of security when a text-based message is to be delivered by audio signal such as voice. Certain embodiments of the present invention implement automated screening of bystanders by collecting a series of account data of a user in real time, and improving efficiency in the automated screening by checking the account data in a certain order of decreasing importance such that the real time data collection and associated relationship analysis should be done in the shortest time with minimal accesses.

Certain embodiments of the present invention enables establishing a secure group for the voice delivery to the user by scanning content of the text-based message according to configuration the embodiments such as security/confidentiality flag, assignments of a key to a bystander with proximity data of the mobile devices. Accordingly, the same embodiments of the present invention offer security of communication very efficiently by enabling voice communication of the text-based message with people from the secure group without real time data collection, relationship analysis, and content scanning as usually required to attain security. Further, certain embodiments of the present invention may improve efficiency of content scanning, real time data collection and analysis by employing a centralized analytics system, in a cloud or a data center environment, having substantially more computing resources that the mobile devices and consequently enabling delivery of the same functionality without overloading the mobile devices.

Figure 5:
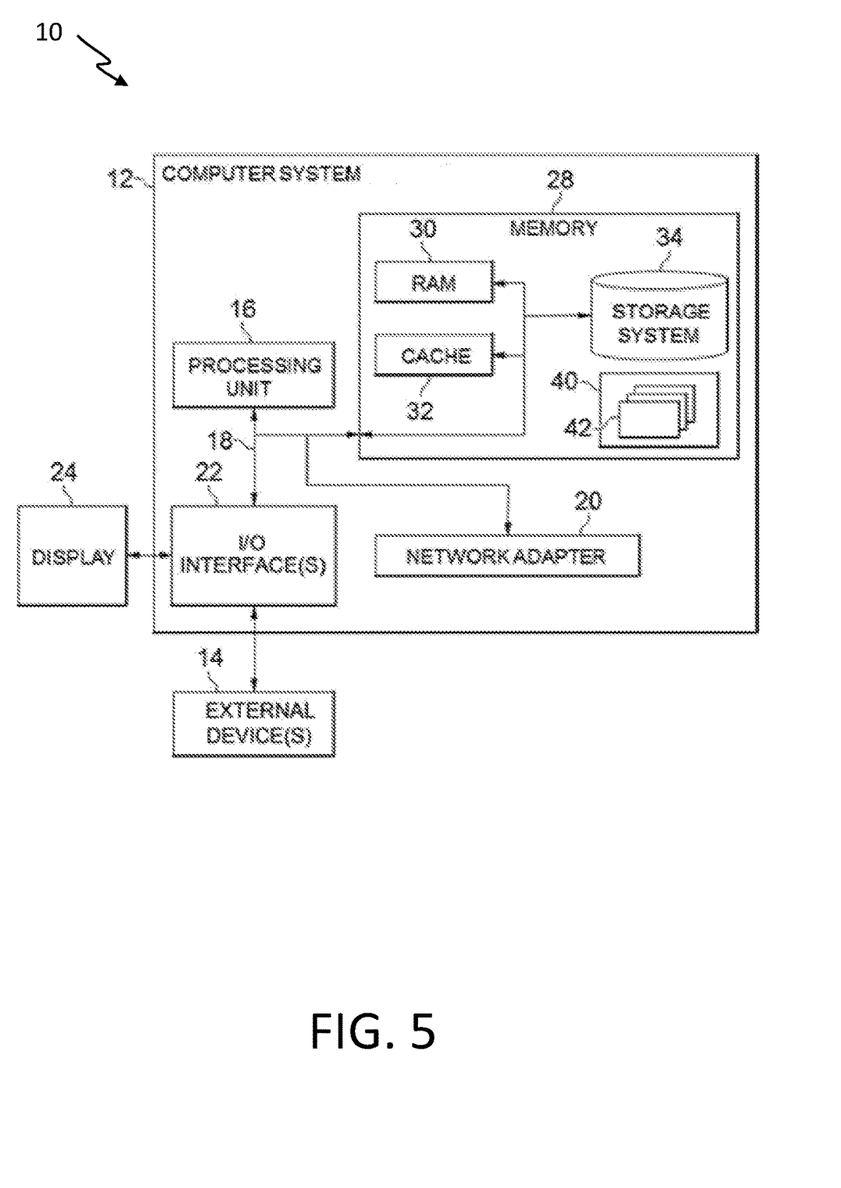
FIG. 5 depicts a cloud computing node according to an embodiment of the present invention.
Figure 6:
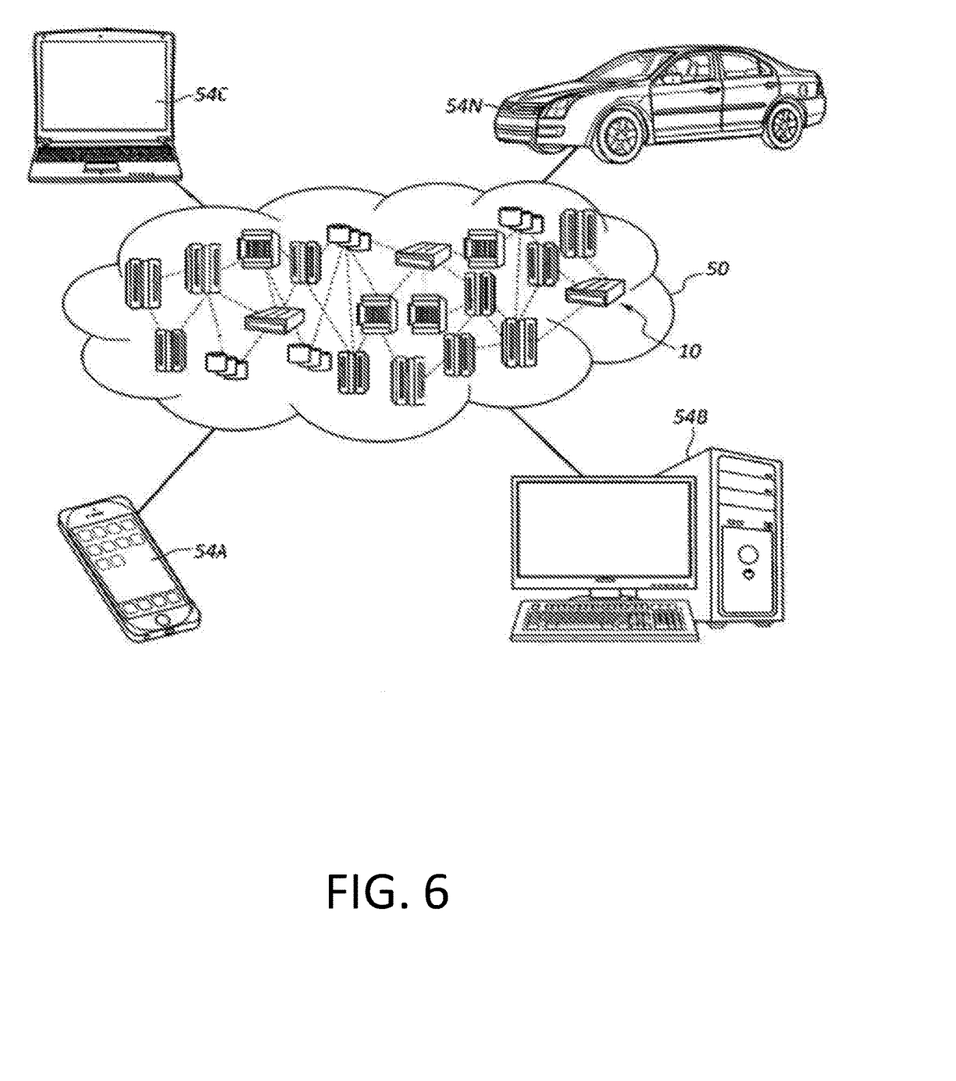
FIG. 6 depicts a cloud computing environment according to an embodiment of the present invention.
Figure 7:
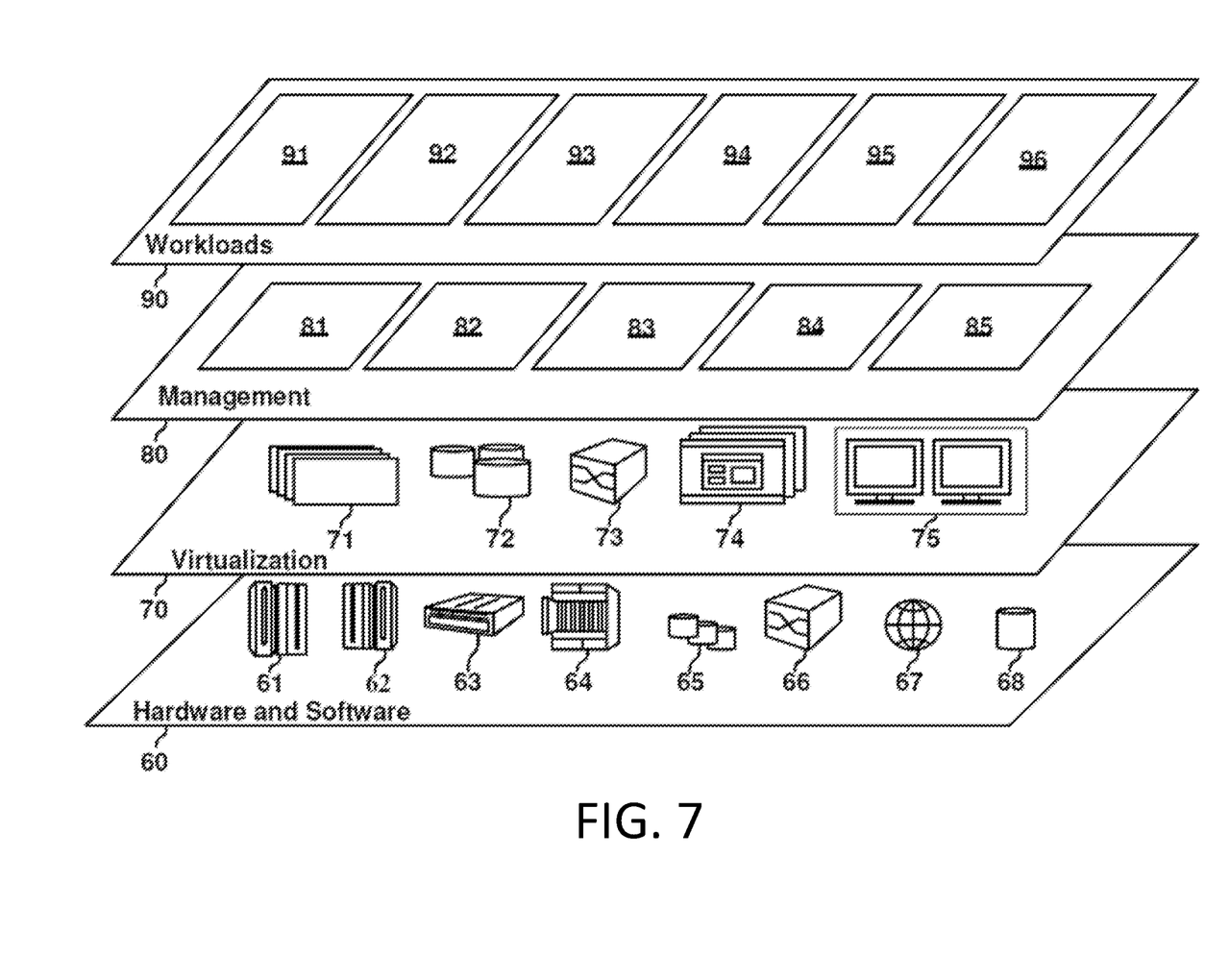
FIG. 7 depicts abstraction model layers according to an embodiment of the present invention.

FIGS. 5-7 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

One or more program 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of the voice delivery application 130 of FIG. 1. Program modules 42, as in the message readout preference analyzer 150 of FIG. 1, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for a cognitive analytics of a text-based message, a user device environment diagnosis, and a sender-user-bystander interrelationship analysis 96, as described herein. The processing components 96 can be understood as one or more program 40 described in FIG. 5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for confidentially delivering a text-based message by voice, comprising:
   receiving, by one or more processor of a user mobile device running a voice delivery application, the text-based message to a user using the user mobile device sent from a sender using the sender device via mobile services network;
   storing device environment data comprising inputs from at least one sensor of the user mobile device;

determining, based on the device environment data, that the user mobile device is enabled to read the text-based message out for the user, and that at least one bystander is present within a hearing distance from the user, wherein the determining comprising:
  discovering that the user mobile device is not coupled to an external speaker;
  discovering that the user mobile device is moving slower than a threshold speed set for delivering the text-based message by voice; and
  discovering that the bystander is present within a range of embedded speaker of the user mobile device;
recording that the sender and the bystander are in a same confidentiality group based on data comprising communication service subscription data of the user, contacts stored in the user mobile device, and social media data for each of the user, the sender, and the bystander, respectively;
scanning content of the text-based message for any confidentiality restriction based on predefined keywords appearing in envelope data of the text based message;
ascertaining that the user wants the text-based message to be read to the user, according to configuration of the voice delivery application or a response to read the text-based message from the user upon being prompted; and
delivering the text-based message by voice such that the user hears the text-based message.

2. The computer implemented method of claim 1, said recording comprising:
  discovering that the user shares a subscription plan with the sender and the bystander; and
  recording that the sender and the bystander are in the same confidentiality group.

3. The computer implemented method of claim 1, said recording comprising:
  discovering that the user does not share a subscription plan with the sender and the bystander;
  discovering that the sender and the bystander have respective entries in the contacts of the user mobile device and that the sender and the bystander are in a same group of the contacts; and
  recording that the sender and the bystander are in the same confidentiality group.

4. The computer implemented method of claim 1, said recording comprising:
  discovering that the user does not shares a subscription plan with the sender and the bystander;
  discovering that the sender and the bystander are not in a same group of the contacts of the user mobile device;
  discovering that the sender, the user, and the bystander are related in at least one social media and have interactions more than a minimum set of the same confidentiality group; and
  recording that the sender and the bystander are in the same confidentiality group.

5. The computer implemented method of claim 1, said delivering comprising:
  playing an audio stream corresponding to the text-based message on a speaker, wherein the speaker is either embedded in the user mobile device or external and coupled to the user mobile device;
  storing a responding speech from the user via a recording device coupled to the user mobile device, wherein the responding speech is enabled by the configuration of the voice delivery application;
  converting the responding speech to a response text message; and
  sending the response text message to the sender by use of the envelope data of the received text message.

6. A computer program product comprising:
a computer readable storage medium readable by one or more processor and storing instructions for execution by the one or more processor for performing a method for confidentially delivering a text-based message by voice, comprising:
  receiving, by the one or more processor of a user mobile device running a voice delivery application, the text-based message to a user using the user mobile device sent from a sender using the sender device via mobile services network;
  storing device environment data comprising inputs from at least one sensor of the user mobile device;
  determining, based on the device environment data, that the user mobile device is enabled to read the text-based message out for the user, and that at least one bystander is present within a hearing distance from the user, wherein the determining comprising:
    discovering that the user mobile device is not coupled to an external speaker;
    discovering that the user mobile device is moving slower than a threshold speed set for delivering the text-based message by voice; and
    discovering that the bystander is present within a range of embedded speaker of the user mobile device;
  recording that the sender and the bystander are in a same confidentiality group based on data comprising communication service subscription data of the user, contacts stored in the user mobile device, and social media data for each of the user, the sender, and the bystander, respectively;
  scanning content of the text-based message for any confidentiality restriction based on predefined keywords appearing in envelope data of the text based message;
  ascertaining that the user wants the text-based message to be read to the user, according to configuration of the voice delivery application or a response to read the text-based message from the user upon being prompted; and
  delivering the text-based message by voice such that the user hears the text-based message.

7. The computer program product of claim 6, said recording comprising:
  discovering that the user shares a subscription plan with the sender and the bystander; and
  recording that the sender and the bystander are in the same confidentiality group.

8. The computer program product of claim 6, said recording comprising:
  discovering that the user does not share a subscription plan with the sender and the bystander;
  discovering that the sender and the bystander have respective entries in the contacts of the user mobile device and that the sender and the bystander are in a same group of the contacts; and
  recording that the sender and the bystander are in the same confidentiality group.

9. The computer program product of claim 6, said recording comprising:
  discovering that the user does not shares a subscription plan with the sender and the bystander;

discovering that the sender and the bystander are not in a same group of the contacts of the user mobile device;

discovering that the sender, the user, and the bystander are related in at least one social media and have interactions more than a minimum set of the same confidentiality group; and recording that the sender and the bystander are in the same confidentiality group.

10. The computer program product of claim 6, said delivering comprising:

playing an audio stream corresponding to the text-based message on a speaker, wherein the speaker is either embedded in the user mobile device or external and coupled to the user mobile device;

storing a responding speech from the user via a recording device coupled to the user mobile device, wherein the responding speech is enabled by the configuration of the voice delivery application;

converting the responding speech to a response text message; and sending the response text message to the sender by use of the envelope data of the received text message.

11. A system comprising:

a memory;

one or more processor in communication with memory; and program instructions executable by the one or more processor via the memory to perform a method for confidentially delivering a text-based message by voice, comprising:

receiving, by the one or more processor of a user mobile device running a voice delivery application, the text-based message to a user using the user mobile device sent from a sender using the sender device via mobile services network;

storing device environment data comprising inputs from at least one sensor of the user mobile device;

determining, based on the device environment data, that the user mobile device is enabled to read the text-based message out for the user, and that at least one bystander is present within a hearing distance from the user, wherein the determining comprising:

discovering that the user mobile device is not coupled to an external speaker;

discovering that the user mobile device is moving slower than a threshold speed set for delivering the text-based message by voice; and discovering that the bystander is present within a range of embedded speaker of the user mobile device;

recording that the sender and the bystander are in a same confidentiality group based on data comprising communication service subscription data of the user, contacts stored in the user mobile device, and social media data for each of the user, the sender, and the bystander, respectively;

scanning content of the text-based message for any confidentiality restriction based on predefined keywords appearing in envelope data of the text based message;

ascertaining that the user wants the text-based message to be read to the user, according to configuration of the voice delivery application or a response to read the text-based message from the user upon being prompted; and delivering the text-based message by voice such that the user hears the text-based message.

12. The system of claim 11, said recording comprising:

discovering that the user shares a subscription plan with the sender and the bystander; and recording that the sender and the bystander are in the same confidentiality group.

13. The system of claim 11, said recording comprising:

discovering that the user does not share a subscription plan with the sender and the bystander;

discovering that the sender and the bystander have respective entries in the contacts of the user mobile device and that the sender and the bystander are in a same group of the contacts; and recording that the sender and the bystander are in the same confidentiality group.

14. The system of claim 11, said recording comprising:

discovering that the user does not shares a subscription plan with the sender and the bystander;

discovering that the sender and the bystander are not in a same group of the contacts of the user mobile device;

discovering that the sender, the user, and the bystander are related in at least one social media and have interactions more than a minimum set of the same confidentiality group; and recording that the sender and the bystander are in the same confidentiality group.

* * * * *